United States Patent [19]

Suh

[11] Patent Number: 5,606,382
[45] Date of Patent: Feb. 25, 1997

[54] MANUAL FOCUSING CIRCUIT USING A SIGNAL STABILIZER

[75] Inventor: Inh-seok Suh, Kyounggi-do, Rep. of Korea

[73] Assignee: Samsung Aerospace Industries, Ltd., Kyeongsangnam-do, Rep. of Korea

[21] Appl. No.: 500,825

[22] Filed: Jul. 11, 1995

[30] Foreign Application Priority Data

Jul. 18, 1994 [KR] Rep. of Korea ............... 94-17283

[51] Int. Cl.⁶ .......................................... G03B 1/18
[52] U.S. Cl. .................... 396/101; 396/125; 396/129; 396/137
[58] Field of Search .................... 354/195.1, 195.12, 354/195.13

[56] References Cited

U.S. PATENT DOCUMENTS 4,514,075 4/1985 Negishi et al. .................... 354/446
4,613,224 9/1986 Ogasawara ........................ 354/402
4,972,078 11/1990 Hasebe et al. .................... 250/229

Primary Examiner—Safet Metjahic
Assistant Examiner—Daniel Chapik
Attorney, Agent, or Firm—Finnegan, Henderson, Farabow, Garrett & Dunner, L.L.P.

[57] ABSTRACT

A manual focusing circuit of a camera comprising a rotation ring having a plurality of projections, wherein the ring is manually rotated forward and rearward by a user. The manual focusing circuit further comprises a first sensing element, which is coupled to one of the projections of the rotation ring, for producing a first signal; a second sensing element, which is coupled to another of the projections of the rotation ring, for producing a second signal having a phase difference of 90 degrees against the first signal; a signal stabilizer, which is coupled to the second sensing element, for removing a noise from the second signal to produce a stabilized signal representing a rotation number of the rotation ring; and circuitry, which is coupled to the first sensing element and the signal stabilizer, for producing an output signal representing a rotation direction of the rotation ring based on the first signal and the stabilized signal.

7 Claims, 5 Drawing Sheets

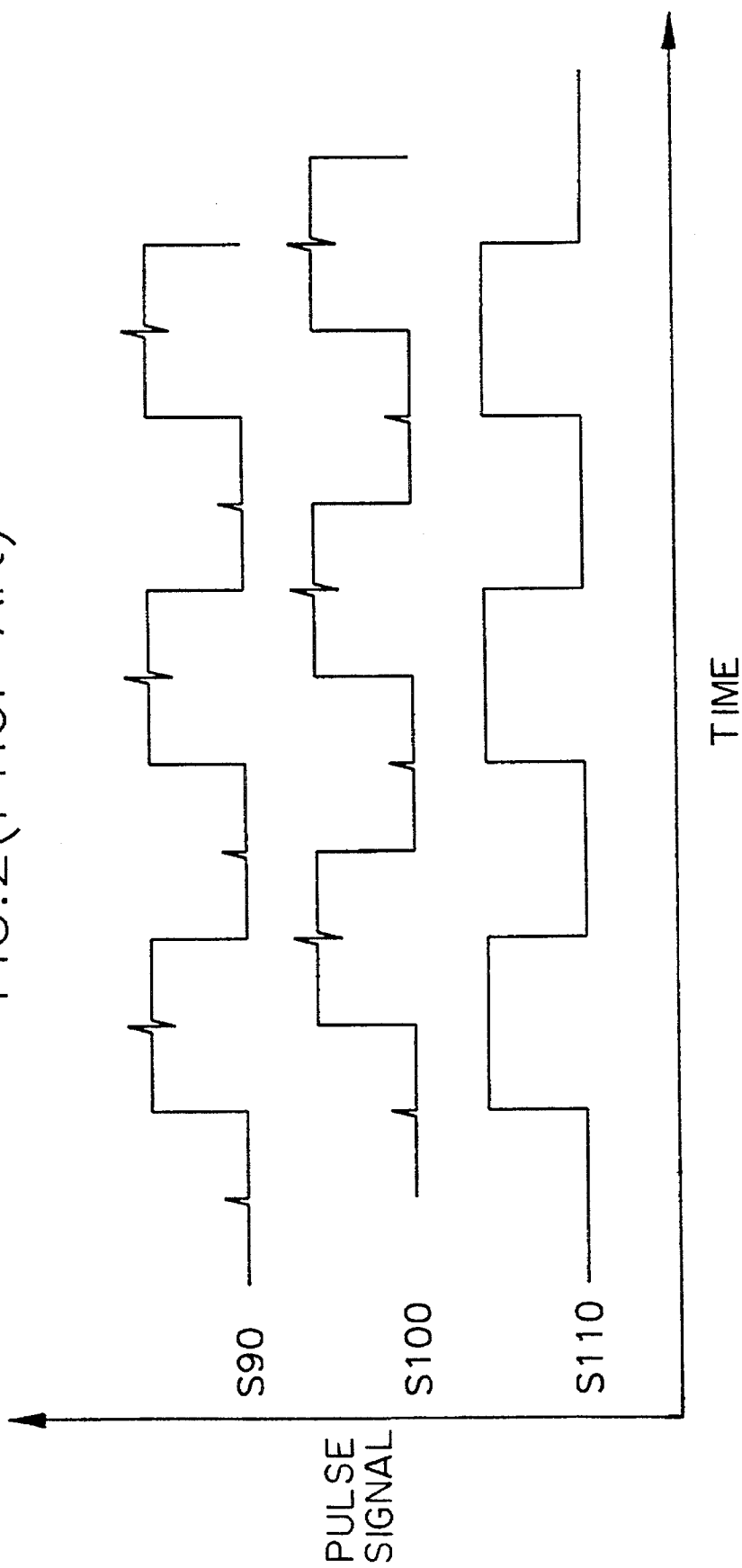

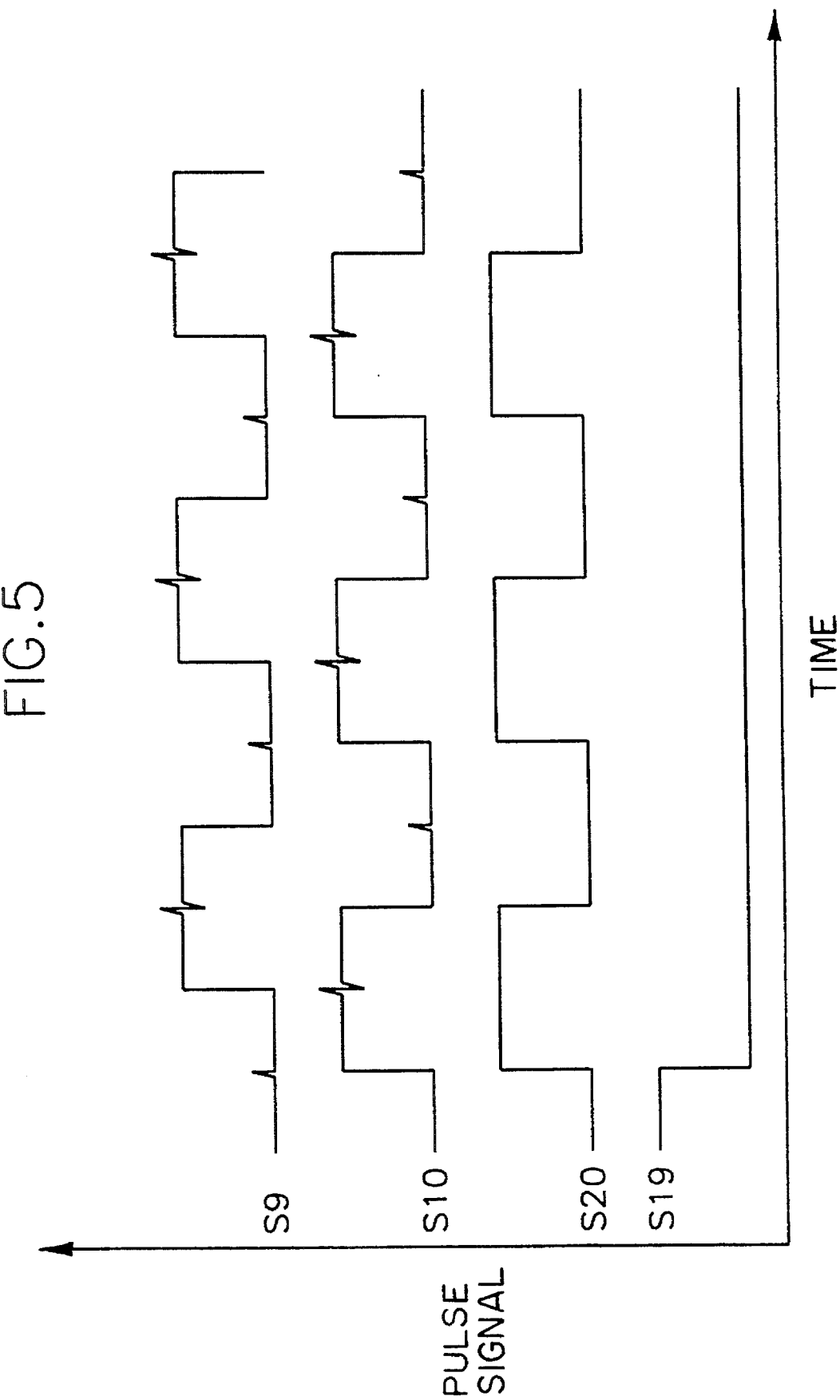

MANUAL FOCUSING CIRCUIT USING A SIGNAL STABILIZER

BACKGROUND OF THE INVENTION

A. Field of the Invention

The present invention relates generally to a manual focusing circuit using a signal stabilizer, and more particularly to a manual focusing circuit using a signal stabilizer in an inner focus lens, which can prevent destabilization caused by noise when a user focuses manually.

B. Description of Related Art

Conventional focusing methods of a camera include a manual focusing method and an automatic focusing method. In the manual focusing method, focus is made by a signal produced from a manual focusing circuit when a user manually rotates a rotation ring.

Reference will now be made to a conventional manual focusing circuit with reference to the accompanying drawings. FIG. 1 is a detailed circuit diagram illustrating the conventional manual focusing circuit.

The conventional manual focusing circuit includes a power supply VCC for activating a circuit, a manual ring 80 having a projection, a first photoelectric conversion element 40 connected to the projection of the manual ring 80 and positioned to make a phase difference of an output signal ninety degrees, a second photoelectric conversion element 60, resistors 50 and 70 for producing pulse signals S90 and S100 produced from the first and second photoelectric conversion elements 40 and 60, and a D flip-flop 120 for receiving the pulse signals S90 and S100 produced from the resistors 50 and 70 producing a pulse output signal S110, that is, a rotation direction signal.

The operation of the conventional manual focusing circuit is as follows:

When the operation is started, power is supplied to the light emitting diodes 40D and 60D of the first and second photoelectric elements 40 and 60, to emit light.

When the user manually rotates the manual ring 80, the light from the light emitting diodes 40D and 60D travels through the first and second photoelectric elements 40 and 60, respectively, or is blocked by a projection of the manual ring 80, and the pulse signals S90 and S100 produced through resistors 50 and 70 are electrically turned ON or OFF. An operational waveform for this is illustrated in FIG. 2.

Referring to FIGS. 2 and 3, the pulse signals S90 and S100 includes a noise caused by a mutual interference between the two signals S90 and S100. The pulse signal S100 is inputted to a clock terminal CLK of the D flip-flop 120 and a pulse signal S110 is produced through the D flip-flop 120. The operational waveform chart for pulse signals S90, S100, and S110 is illustrated in FIG. 2. A microcontroller (not shown) obtains a rotation number by counting a pulse number of the pulse signal S100 for a predetermined time.

However, when the noise from pulse signal S100 greatly affects the output signal S110 in the conventional manual focusing circuit, it causes an increase in the pulse number. As a result, the pulse number of pulse signal S100 cannot be accurately counted. In addition, since the output from the D flip-flop 120, that is, a rotation direction signal S110, is produced as a high or low signal with noise, an accurate direction cannot be determined.

To overcome these disadvantages, an integrated circuit having low noise is used. However, due to the size of the noise, malfunctions occasionally occur with a hysteresis width of the low noise integrated circuit.

Another disadvantage of the conventional manual focusing circuit is that a great deal of power is consumed since a dry batter is used as the power supply and the power is continuously supplied to the photoelectric conversion element.

SUMMARY OF THE INVENTION

The object of the present invention is to overcome the problems and disadvantages of the conventional manual focusing circuit. To achieve this and other objects, a manual focusing circuit of a camera of the present invention, as embodied and broadly described herein, comprises a rotation ring having a plurality of projections, wherein the ring is manually rotated forward and rearward by a user; a first sensing element, coupled to one of the projections of the rotation ring, for producing a first signal; a second sensing element, coupled to another of the projections of the rotation ring, for producing a second signal having a phase difference of 90 degrees against the first signal; a signal stabilizer, coupled to the second sensing element, for removing a noise from the second signal to produce a stabilized signal representing a rotation number of the rotation ring; and means, coupled to the first sensing element and the signal stabilizer, for producing an output signal representing a rotation direction of the rotation ring based on the first signal and the stabilized signal.

According to another aspect of the present invention, the manual focusing circuit of the camera further comprises means for selecting either an automatic or manual focusing mode of a camera; and means for supplying power to the first and second sensing elements only when the manual focusing mode is selected.

The objects and advantages of the invention will be set forth in part in the description which follows, and in part will be obvious from the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 2 is an operational form chart of each signal in the conventional manual focusing circuit.

FIG. 5 is an operational wave form chart of each signal in a rearward direction illustrating the manual focusing circuit using a signal stabilizer according to a preferred embodiment of the present invention.

DESCRIPTION OF A PREFERRED EMBODIMENT

Reference will now be made in detail to a preferred embodiment of the invention, an example of which is illustrated in the accompanying drawings.

Figure 3:
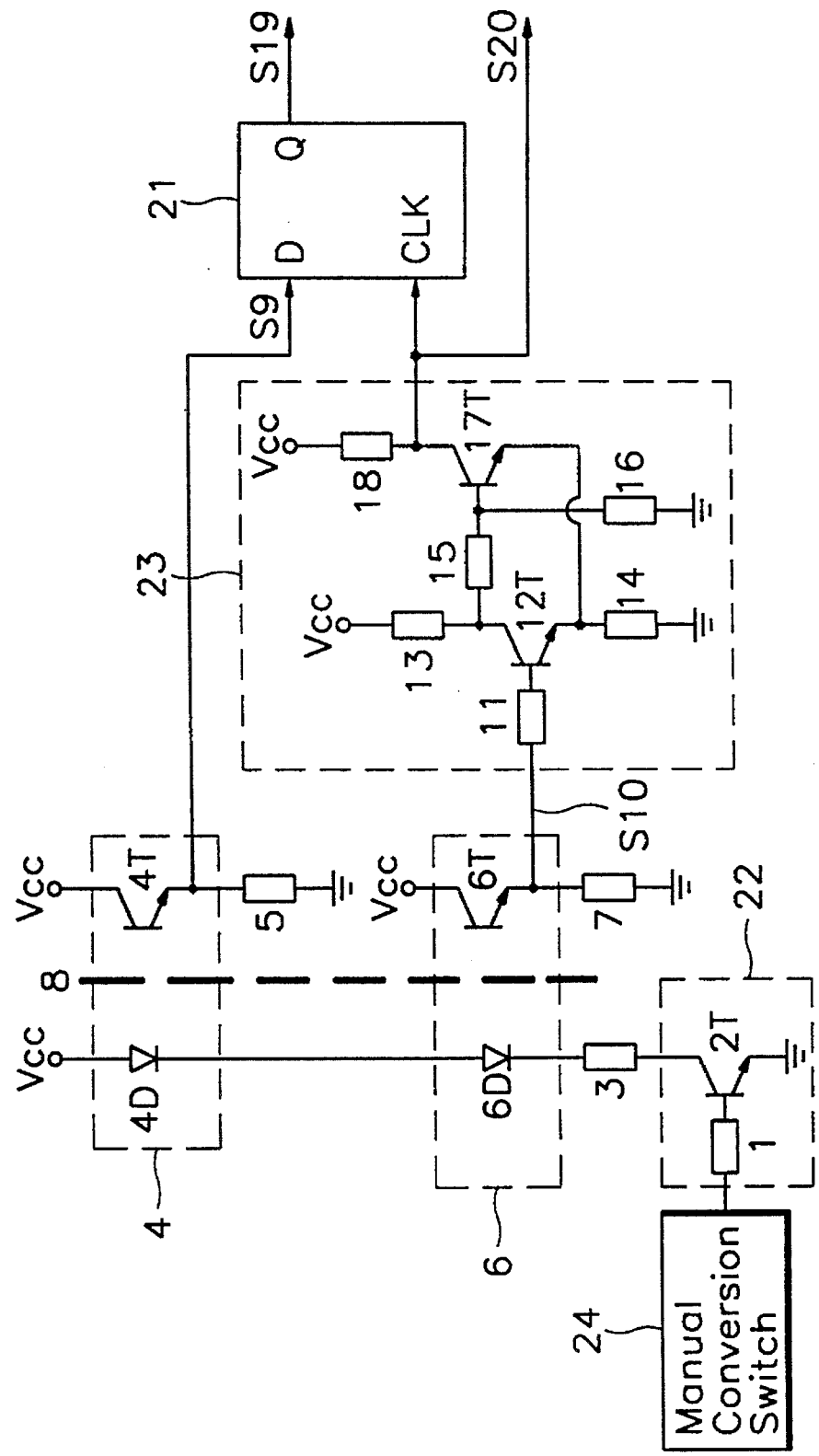
FIG. 3 is a detailed circuit diagram illustrating manual focusing circuit using a signal stabilizer according to a preferred embodiment of the present invention.

Referring to FIG. 3, the manual focusing circuit using a signal stabilizer according to a preferred embodiment of the present invention includes a first light emitting diode 4D connected to power supply VCC for supplying power and for emitting light; a second light emitting diode 6D connected to the first light emitting diode 4D and for emitting light; a second transistor 2T connected to the second light emitting diode 6D and for carrying out a power saving function; a manual conversion switch 24 connected to the second transistor 2T; transistors 4T and 6T having a collector terminal connected to the power supply VCC and for converting the light from the first light emitting diode 4D into a signal; resistors 5 and 7 connected to emitter terminals of the transistors 4T and 6T; a resistor 11 connected to the emitter terminal of the transistor 6T; a transistor 12T having a base terminal connected to the resistor 11; a resistor 13 connected to a collector terminal of the transistor 12T and to the power supply VCC; a resistor 15 connected to a collector terminal of the transistor 12T; a resistor 14 connected to an emitter terminal of the transistor 12T; a transistor 17T having an emitter terminal connected to the emitter terminal of the transistor 12T and a base terminal connected to the resistor 15; a resistor 18 connected to a collector terminal of the transistor 17T; and a D flip-flop 21 having a clock terminal CLK connected to the collector terminal of the transistor 17T and an input terminal D connected to the emitter terminal of the transistor 4T.

Figure 1:
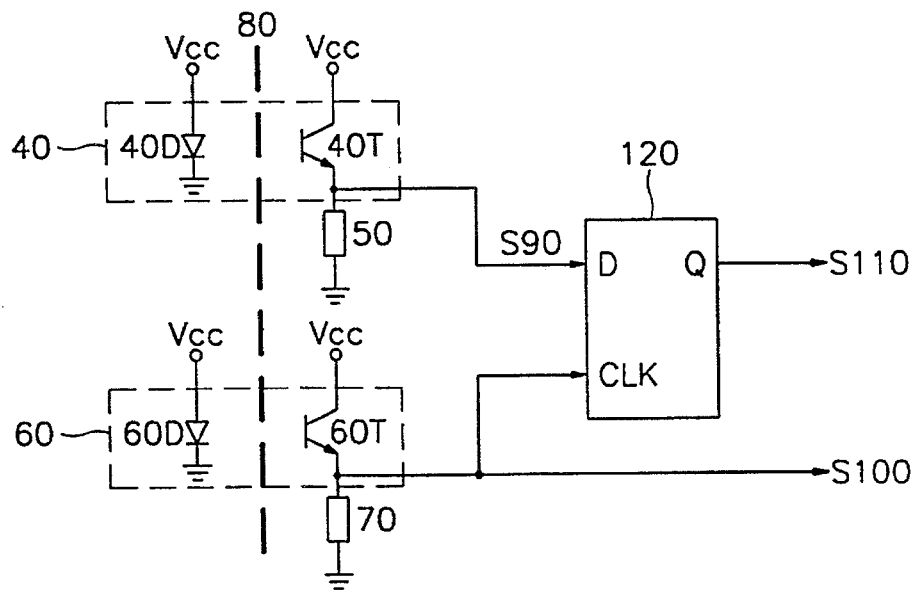
FIG. 1 is a detailed circuit diagram illustrating the conventional manual focusing circuit.
Figure 6:
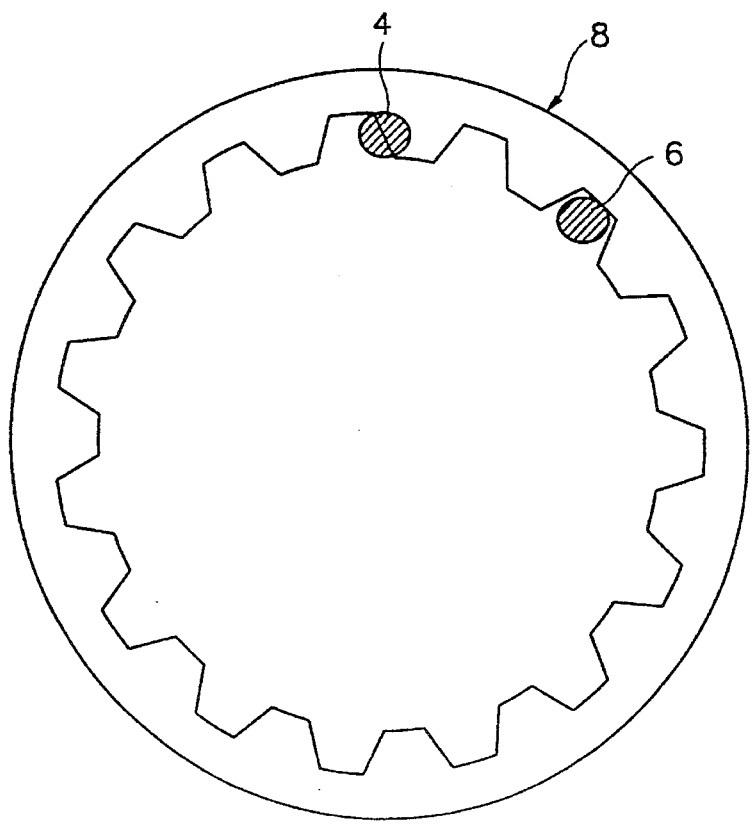
FIG. 6 is a detailed circuit diagram illustrating a rotation ring in the manual focusing circuit using a signal stabilizer according to a preferred embodiment of the present invention.

The rotation ring 8 includes first and second photoelectric conversion elements 4 and 6, and is illustrated in FIG. 6.

The operation of the manual focusing circuit using the signal stabilizer of the present invention, as embodied herein, is as follows:

When a user turns ON the manual conversion switch 24, a high signal is inputted to the resistor 1. Then, the transistor 2T is turned ON and power is applied to the first light emitting diode 4D of the first photoelectric conversion element 4.

Figure 4:
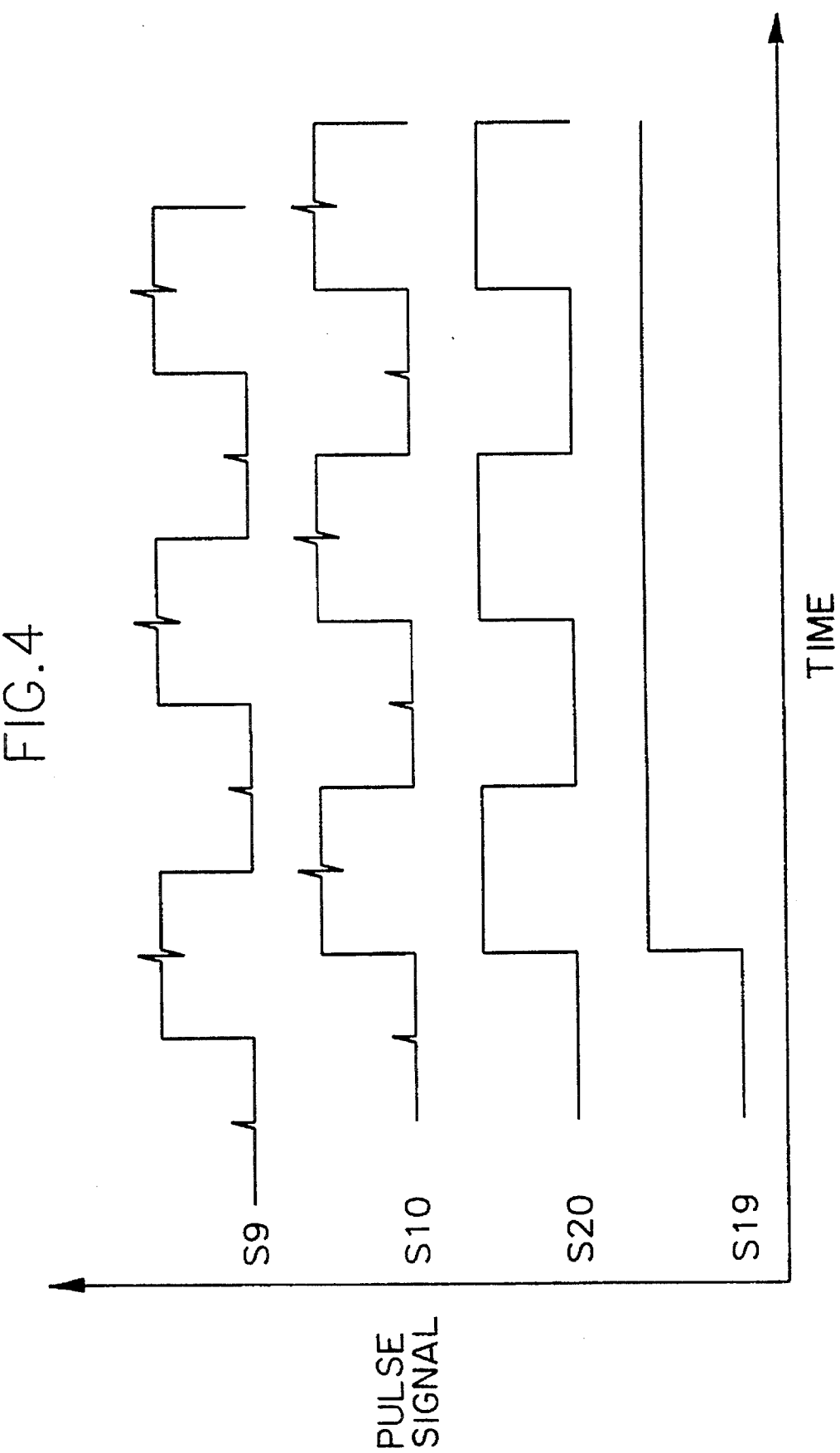
FIG. 4 is an operational wave form chart of each signal in a forward direction illustrating the manual focusing circuit using a signal stabilizer according to a preferred embodiment of the present invention.

When power is applied, the first and second light emitting diodes 4D and 6D emit light. When the user rotates the rotation ring 8, light from the light emitting diodes 4D and 6D travels through the first and second photoelectric conversion elements 4 and 6 or is blocked by a projection from the rotation ring 8. The pulse signals S9 and S10, produced from the resistors 5 and 7, are electrically turned ON or OFF. The wave forms of the pulse signals S9 and S10 in the forward direction are illustrated in FIG. 4, and the waveforms of the pulse signals S9 and S10 in the rearward direction are illustrated in FIG. 5.

The pulse signal S10 is stabilized through the resistor 11 in the signal stabilizer 23 and subsequently through transistors 12T and 17T. The stabilized pulse output signal S20 is inputted to the clock terminal CLK in the D flip-flop 21, and the pulse signal S9 is applied to an input terminal D in the D flip-flop 21. The D flip-flop 21 produces a signal S19. The waveform of the pulse signal S19 in the forward direction is illustrated in FIG. 4, and the waveform of the pulse signal S19 in the rearward direction is illustrated in FIG. 5.

The stabilized pulse output signal S20 described above is obtained as follows. Referring to FIG. 3, the resistor 14 is operated as a common emitter terminal resistor of transistors 12T and 17T. At this point, if the pulse signal S10 is less than the voltage applied to the resistor 14, the transistor 12T is turned OFF. Accordingly, the transistor 17T is turned ON by the voltage added to its base terminal by resistors 15 and 16, and the output signal S20 becomes low.

If the input signal S10 is equal to or greater than the voltage applied to the resistor 14, the transistor 12T is turned ON, the collector terminal voltage of the transistor 12T becomes low, and the transistor 17T is turned OFF. Accordingly, the output signal S20 becomes high.

Accordingly, a hysteresis width can be varied by controlling the voltage which changes the output signal S20 from and ON state to an OFF state by controlling the resistors 15 and 16. The output signal S20 is changed from an OFF state to an ON state by controlling the resistor 14 which varies the voltage.

As described above, the manual focusing circuit using the signal stabilizer 23 of the present invention has the advantages that the destabilization of the operation caused by noise can be prevented when a user manually focuses by using a signal stabilizer in an inner focus lens, and power can be saved by applying the power only when the user focuses manually.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A manual focusing circuit of a camera, comprising:

a focusing ring having a plurality of projections, wherein said ring is manually rotatable clockwise and counter-clockwise by a user during a manual focusing mode;

a first sensing element, coupled to one of said projections of said focusing ring, for producing a first signal;

a second sensing element, coupled to another of said projections of said focusing ring, for producing a second signal having a phase difference of 90 degrees relative to said first signal;

a signal stabilizer, coupled to said second sensing element, for removing noise from said second signal to produce a stabilized signal representing a rotation number of said focusing ring;

means, coupled to said first sensing element and said signal stabilizer, for producing an output signal representing a rotation direction of said focusing ring based on said first signal and said stabilized signal;

means for selecting either the manual focusing mode or an automatic focusing mode of said camera; and means responsive to said selecting means for supplying power to said first and second sensing elements only when the manual focusing mode is selected.

2. The manual focusing circuit of claim 1, wherein said said output signal producing means includes a flip-flop.

3. The manual focusing circuit of claim 1, wherein said signal stabilizer includes at least one switching transistor.

4. The manual focusing circuit of claim 1, wherein said signal stabilizer includes at least one resistor having a predetermined value, said value corresponding to a reference voltage.

5. The manual focusing circuit of claim 1, wherein said first and second signals include a pulse signal.

6. The manual focusing circuit of claim 2, wherein said flip-flop includes an input signal terminal coupled to said first signal and a clock terminal coupled to said second signal.

7. The manual focusing circuit of claim 1, wherein said power supplying means includes at least one switching transistor having an operative state only when the manual focusing mode is selected.

* * * * *